Nov. 23, 1948.　　　　E. P. BUCKTHAL　　　　2,454,630
　　　　　METHOD AND APPARATUS FOR INDICATING
　　　　　　　　POTENTIAL GRADIENTS
　　　　　　　　　Filed Jan. 8, 1945
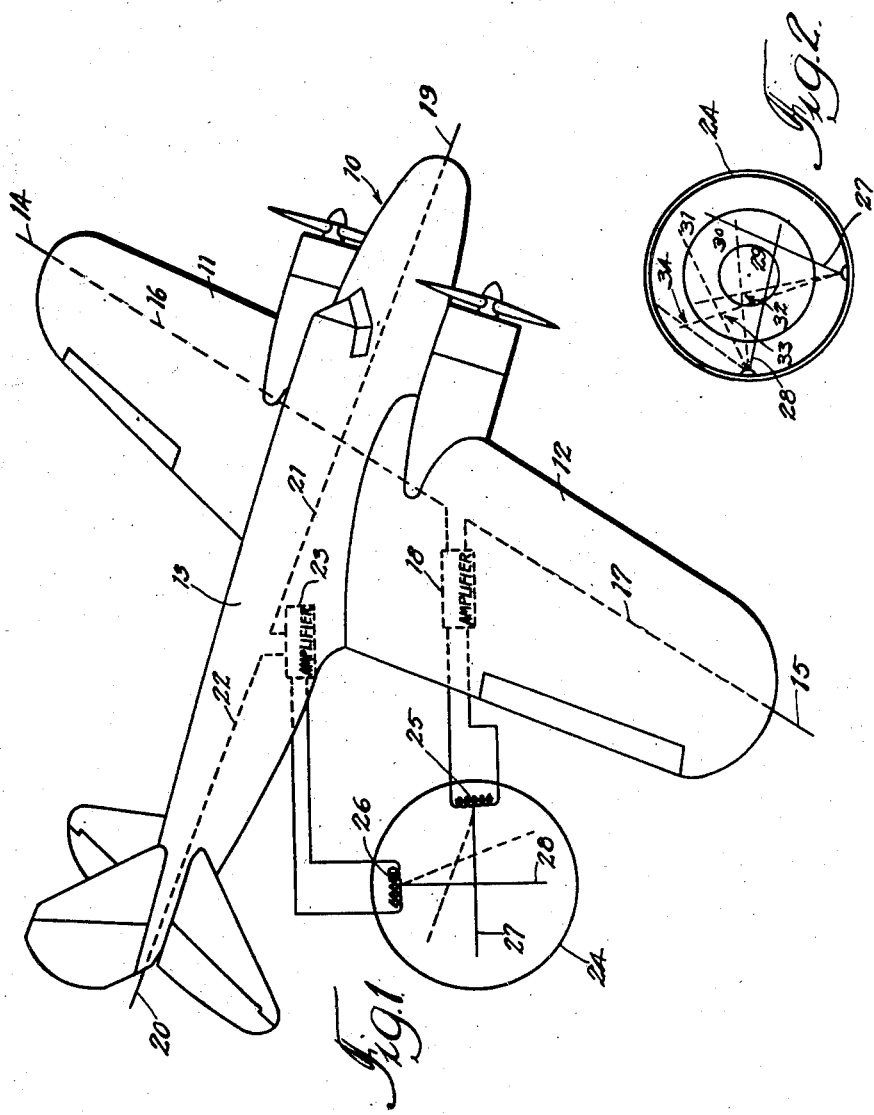

Patented Nov. 23, 1948

2,454,630

UNITED STATES PATENT OFFICE 2,454,630

METHOD AND APPARATUS FOR INDICATING POTENTIAL GRADIENTS

Elmer P. Buckthal, Brookfield, Ill., assignor to United Air Lines, Inc., Chicago, Ill., a corporation of Delaware Application January 8, 1945, Serial No. 571,919

4 Claims. (Cl. 177—311)

This invention relates to methods and apparatus for indicating potential gradients, more particularly to apparatus and methods for indicating the presence of electrostatic fields in the atmosphere through which an aircraft is flying, and it is an object of the invention to provide improved apparatus and methods of the character indicated.

It is a constant aim to improve the safety and comfort of persons flying in aircraft. Technological advances in the mechanical arts have resulted in aircraft that are very largely safe from mechanical and structural failure when the aircraft is operated under known conditions of operation, for example known temperature of the atmosphere and velocity of the wind. While the advancement of the science of meterology has also been rapid and general weather conditions can be predicted with accuracy for hours in advance of an appointed time, there is no adequate method for predicting in advance what the actual condition of the atmosphere is within a relatively short distance from the aircraft. To overcome this deficiency instruments have been developed for use on the aircraft so that the flight personnel can have an indication of local atmospheric conditions and thus can navigate the aircraft around areas in which dangerous conditions are prevailing.

One unpredictable local hazard encountered by aircraft in flight is the presence in the atmosphere of highly charged areas, that is, areas around and in which strong electrostatic fields exist, such for example as clouds in storm areas. Clouds floating at random in the sky and not in the vicinity of a storm area also are often highly charged. The presence of a storm area and the likelihood of encountering highly charged areas can be predicted in advance, but the exact local condition of a charged area such as its intensity and location which will determine whether that particular area should be avoided by the aircraft are not predictable and must be determined on each aircraft at the moment under consideration.

Flying an aircraft into such a charged area is hazardous to the aircraft, to the flight personnel and to the passengers, because of the danger of the aircraft being struck by a lightning discharge. In fact, flying the aircraft into a charged area may be the influencing factor causing the discharge. The only practical way of avoiding the hazards attendant upon flying in such areas is to avoid the area by going around it.

All charged areas are not hazardous because the electrostatic field in the charged area may be of such a small magnitude that no discharge would occur if the aircraft were flown into it, and a highly charged area need not be avoided by a greater distance than is necessary to assure that no discharge will occur. In order to maintain the established route of flight as closely as possible, even though charged areas are encountered, particularly in order to maintain the desired time schedule of commercial flight, it is desirable to neglect charged areas unless such areas are dangerous, a proper safety factor being considered. Accordingly, it is a further object of the invention to provide improved apparatus of the character indicated for indicating the intensity of gradient of an electrostatic field.

It is a further object of the invention to provide improved apparatus of this character for indicating the location with respect to an aircraft in flight of an electrostatic field in the atmosphere.

It is a further object of the invention to provide improved apparatus of this character for indicating the direction of polarization of an electrostatic field in the atmosphere.

It is a further object of the invention to provide improved apparatus of the character indicated for giving in a single indication the location with respect to an aircraft in flight and the intensity or gradient of an electrostatic field in the atmosphere.

It is well understood that clouds of the cumulonimbus type have electrostatic fields surrounding them. These fields have components in the lateral, longitudinal and vertical directions since the electrostatic lines of force by which an electrostatic field is indicated extend between the cloud and the ground as well as between clouds, there being of course distortions in the electrostatic field produced by the presence of trees, buildings, and other objects on the ground. The strength or intensity of the electrostatic field varies with the distance from the cloud producing it.

In speaking of the electrostatic charge accumulated on a cloud, for example, it is convenient to assume that the surface of the earth is at zero potential and that the cloud is at a potential above zero. In actual instances the potential of a cloud may be above or below the potential of the earth's surface, but this fact does not produce any error even though it is assumed that the earth is at zero potential since the difference of potential between two points is the important factor.

The difference of potential between two points divided by the distance between those points is known as the potential gradient. A strong field, or a field of high intensity, will have a high potential existing between two points in the field and hence the potential gradient is high. The converse is also true. In a field of uniform strength the potential gradient is the same at any point in the field but if the field is not uniform the potential gradient is different at every point in the field. It is also to be noted that the potential gradient in an electrostatic field is different in different directions within the field.

If a conductor is placed at some point in an electrostatic field, it assumes the potential of the field existing at that point and also acquires an electrostatic charge which is proportional to the potential. Accordingly by placing two conductors or charge-collecting probes at different points in an electrostatic field and measuring the potential between them, an indication is obtained of the strength or intensity of the electrostatic field, since a field of high intensity will produce a high potential between two probes placed in it and a field of low intensity will produce a low potential between two such probes. By placing the two probes a fixed and known distance apart a potential-indicating instrument connecting the two probes may be calibrated to indicate potential gradient. Furthermore, since two probes placed in an electrostatic field assume the potential of the field and acquire an electrostatic charge, a current will flow between the two probes if the probes are connected by a conductor, the current being dependent on the potentials of the probes and the electrostatic charge accumulated. The current flowing is also an indication of the intensity of the field or the potential gradient.

In carrying out the invention in one form, apparatus for determining the intensity and direction of an electrostatic field is provided, having a first pair of selectively spaced probes or charge collectors and a second pair of selectively spaced probes or charge collectors. A conductor connecting the first pair of charge collectors is arranged to conduct current flow between the charge collectors of the first pair and a conductor connecting the second pair of charge collectors is arranged to conduct current flow between the charge collectors of the second pair. An instrument having two current elements responsive respectively to the currents in the two conductors and having two indicators, each indicator being operated by one of the current elements, is arranged to produce the desired indication.

For a more complete understanding of the invention, reference should now be had to the accompanying drawing in which:

Fig. 1 is a schematic view of an aircraft embodying the invention; and

Fig. 2 is a schematic view of an instrument forming part of the invention.

Referring to Fig. 1 of the drawings, there is shown an aircraft 10 having wings 11 and 12 and a fuselage 13. Mounted on the wing 11 by means of an insulator (not shown) is an exploring probe or charge collector 14. Similarly mounted on the wing 12 is an exploring probe or charge collector 15 and connecting the probes 14 and 15 are conductors 16 and 17 which feed into a current amplifier 18. Probes or charge collectors 19 and 20 are similarly mounted on the front and rear ends respectively of the fuselage 13, and conductors 21 and 22 which connect the probes 19 and 20 feed into a current amplifier 23. It is to be noted that the probes 14, 15 and 19, 20 lie respectively in what may be termed the lateral and longitudinal axes of the aircraft 10.

If the aircraft 10 is flying in the vicinity of a cloud carrying a charge of static electricity the probes 14, 15, 19 and 20 will acquire electrostatic charges and hence will assume the potential of the electrostatic field at the various points. Since the probes 14 and 15 are spaced from each other and are connected by the conductors 16 and 17 a current which is proportional to the potential difference existing between the probes 14 and 15 or to the potential gradient existing between these probes will flow. Similarly, a current will flow in the conductors 21 and 22 from the probes 19 and 20 which is proportional to the potential difference between probes 19 and 20 or to the potential gradient existing between these probes. Since, as indicated above, the potential gradient in an electrostatic field is ordinarily different in different directions, the currents flowing in conductors 16, 17 and 21, 22 may differ from each other.

The currents flowing in the conductors 16, 17 and 21, 22 are very minute, being in the order of microamperes, and the amplifiers 18 and 23, which may be of a well known type, are placed between the conductors 16 and 17 and 21 and 22 respectively to amplify the respective currents to a value in the order of milliamperes for producing a suitable indication. The outputs of the amplifiers 18 and 23 are fed to a composite instrument 24.

The instrument 24 is an ammeter having two independent current coils 25 and 26 receiving respectively the currents from the amplifiers 18 and 23. The current coils are disposed with their axes at right angles to each other to conform to the fact that the probes 14 and 15 lie on a line at right angles to the line on which the probes 19 and 20 lie. Instrument pointers 27 and 28 are actuated respectively by the current coils 25 and 26, the pointers being arranged to intersect at right angles at the center of the instrument dial when there is no electrostatic field present to effect an indication, and the pointers are pivoted so that they can swing in either direction. The direction of deflection of the pointers indicates the direction of the potential gradient, and the magnitude of the deflection indicates the magnitude of the potential gradient. In order to prevent the instrument pointers from deflecting too far when a field of high intensity is encountered and to give an adequate deflection when a field of low intensity is encountered, the pointers may have a logarithmic deflection.

Referring to Fig. 2, the instrument 24 is shown with a dial plate divided into circular areas 29, 30 and 31. The orientation of the instrument 24 within the aircraft is such that the pointer 27 indicates potential gradient between the probes 14 and 15 and the pointer 28 indicates potential gradient between the probes 19 and 20. Consequently deflection to the right or left of the instrument center of the pointer 27 indicates a potential gradient extending toward the right or left and a deflection of the pointer 28 up or down indicates a potential gradient extending forwardly or rearwardly. A line from the center of the instrument to the intersection of the pointers indicates the resultant direction of the potential gradients along the direction of the wings and the fuselage.

The areas 29, 30 and 31 cooperate with the intersection of the pointers 27 and 28 to indicate the magnitude of the potential gradient. If the intersection of the pointers lies in the area 29 it indicates a low value of potential gradient, and if the intersection lies in the area 31 it indicates a high value of potential gradient with the area 30 being an intermediate indication. For example, the areas 29, 30 and 31 may be colored green, amber and red, respectively, to indicate safe, caution and danger. Other means of differentiating the areas may of course be used.

With the foregoing theory and description of structure in mind the operation of the apparatus may best be understood by considering an example. Suppose the aircraft 10 is approaching a thunder cloud having a high electrostatic field, the cloud being ahead and to the left of the course of the aircraft and about five miles distant. The resultant field intensity or potential gradient has components in the directions of probes 14, 15 and 19, 20 which may be of such magnitude that the pointers deflect to intersect at point 32 within area 29. This would be safe for flying. As the aircraft continues to fly on its course and approaches the cloud more closely, the resultant potential gradient increases and consequently the pointers deflect further to intersect at point 33 which lies in the caution area 30. The aircraft, continuing on its course, approaches the cloud still more closely and the pointers will intersect at point 34 within the danger area 31. The potential gradient will be so high in such an area that there is great danger of lightning striking. The aircraft pilot, observing the instrument 24, knows immediately that to avoid the cloud he must turn to the right. Then as the aircraft moves away from the cloud, the pointer intersection moves closer to the safe area 29.

It is apparent that arranging the probes 14, 15 and 19, 20 to lie in the principal axes of the aircraft which intersect at right angles results in a simple instrument construction, since the pointers can be arranged to intersect at ninety degrees in the zero position and thereby simulate the axes of the aircraft, the areas 29, 30 and 31 being circular in character. It is not necessary that the probes be arranged in the same horizontal plane nor is it necessary that the probes lie on axes displaced ninety degrees from each other as shown. It is desirable, however, that there be at least two pairs of probes such as 14, 15 and 19, 20 lying on axes displaced from each other, so that two separate indications may be obtained, and a simpler and more easily understood indication is obtained if the two pairs of probes are on axes displaced ninety degrees. Furthermore, the probes may be mounted in other positions on the aircraft, but the positions shown give good indications of the orientation of the aircraft with respect to a charged area.

The various projections around the aircraft such as the engine nacelles and the rudder fin produce local distortions of the electrostatic field around the aircraft. Single probes placed at any one of these points will give an indication of the potential at such a point, but the local distortion may cause an erroneous indication. Using a series of probes and strategically extending them from the wing and fuselage extremities avoids distortion and results in an accurate indication.

While the invention has been described in connection with a heavier-than-air type aircraft, it will be apparent that any necessary modifications may be made without departing from the true spirit and scope of the invention to adapt the invention for use on aircraft of the lighter-than-air type or to adapt the invention for use in stationary installations. Furthermore, while a particular embodiment of the invention has been shown, it will be understood, of course, that the invention is not limited thereto since many modifications may be made, and it is, therefore, contemplated by the appended claims to cover any such modifications as come within the true spirit and scope of the invention.

Having thus described the invention, what is claimed and desired to be secured by Letters Patent is:

1. Apparatus for determining the intensity and direction of an electrostatic field comprising two sets of selectively spaced charge collectors, the axes of said sets of charge collectors lying across each other at a predetermined angle, conductors connecting said charge collectors in each set to conduct current flow therebetween, and indicating means responsive to the current flow between said charge collectors, said indicating means including a plurality of independently movable pointers and an instrument dial divided into areas for indicating intensity in any direction, said pointers being respectively responsive to the current flow in said conductors of said two sets of charge collectors, said pointers and said dial being correlated to the spacing of said charge collectors to indicate directly both intensity and direction of an electrostatic field.

2. Apparatus for determining the intensity and direction of an electrostatic field comprising a first pair of selectively spaced charge collectors, a second pair of selectively spaced charge collectors, the axes of said pairs of charge collectors lying across each other at a predetermined angle, a conductor connecting said first pair of charge collectors to conduct current flow between the charge collectors of said first pair, a conductor connecting said second pair of charge collectors to conduct current flow between the charge collectors of said second pair, and an instrument having two current elements responsive respectively to the currents in said conductors and having two indicators, each indicator being operated by one of said current elements, said current elements and said indicators being correlated with respect to said pairs of said charge collectors to indicate directly both the intensity and the direction of an electrostatic field.

3. In combination with an aircraft having a wing and a fuselage, apparatus for determining the intensity and direction of electrostatic fields with reference to said aircraft, said apparatus comprising a first pair of charge collectors on the wing of said aircraft, one charge collector of said first pair being placed at each end of the wing, a second pair of charge collectors on the fuselage of said aircraft, one charge collector of said second pair being at the nose and one at the tail, a conductor connecting said wing charge collectors, a conductor connecting said fuselage charge collectors, said conductors being adapted to conduct flow of current between their respective charge collectors and an instrument having a pair of indicators oriented respectively with reference to the wing and fuselage of said aircraft, said instrument having a pair of current coils responsive to the current flow in said conductors, each indicator being controlled by one of said current coils and being respectively correlated with said wing charge collectors and said fuselage charge collectors to indicate directly both the intensity and the direction of an electrostatic field.

4. In combination with an aircraft having a wing and a fuselage, apparatus for determining the intensity and direction of electrostatic fields with reference to said aircraft, said apparatus comprising a first pair of charge collectors on the wing of said aircraft, one charge collector of said first pair being placed at each end of the wing, a second pair of charge collectors on the fuselage of said aircraft, one charge collector of said second pair being at the nose and one at the tail, a conductor connecting said wing charge collectors, a conductor connecting said fuselage charge collectors, said conductors being adapted to conduct flow of current between their respective charge collectors, and an instrument having a pair of intersecting pointers responsive respectively to the current flowing in said conductors, said instrument including a dial divided into areas which cooperate with the intersection of said pointers to indicate said intensity and direction.

ELMER P. BUCKTHAL.

REFERENCES CITED

The following references are of record in the file of this patent:

UNITED STATES PATENTS

| Number | Name | Date |
| --- | --- | --- |
| 1,919,215 | Gunn | July 25, 1933 |
| 2,119,530 | Dunmore | June 7, 1938 |
| 2,210,932 | Gunn | Aug. 13, 1940 |
| 2,333,975 | Bennett | Nov. 9, 1943 |